United States Patent [19]

Someya

[11] Patent Number: 5,148,270

[45] Date of Patent: Sep. 15, 1992

[54] TELEVISION SIGNAL RECEIVING APPARATUS

[75] Inventor: Ikuo Someya, Tokyo, Japan

[73] Assignee: Sony Corporation, Tokyo, Japan

[21] Appl. No.: 658,670

[22] Filed: Feb. 21, 1991

[30] Foreign Application Priority Data

Feb. 26, 1990 [JP] Japan .................. 2-45194

[51] Int. Cl.$^5$ .................. H04N 7/12; H04N 7/18
[52] U.S. Cl. .................. 358/133; 358/141; 358/105; 358/12; 358/136
[58] Field of Search ............... 358/133, 135, 136, 138, 358/140, 141, 11, 12

[56] References Cited

U.S. PATENT DOCUMENTS

| | | | |
|---|---|---|---|
| 4,692,801 | 9/1987 | Ninomiya et al. | 358/138 |
| 4,873,573 | 10/1989 | Thomas et al. | 358/138 |
| 4,924,308 | 5/1990 | Feuchtwanger | 358/105 |
| 4,979,037 | 12/1990 | Mizutani et al. | 358/138 |
| 4,984,077 | 1/1991 | Uchida | 358/105 |
| 4,987,489 | 1/1991 | Hurley et al. | 358/105 |
| 5,031,039 | 7/1991 | Haghiri et al. | 358/138 |
| 5,043,810 | 8/1991 | Vreeswijk et al. | 358/141 |

FOREIGN PATENT DOCUMENTS

0011078 1/1990 Japan .

*Primary Examiner*—John K. Peng
*Assistant Examiner*—Michael Lee
*Attorney, Agent, or Firm*—Alvin Sinderbrand; William S. Frommer

[57] ABSTRACT

A decoding apparatus for decoding a transmitted encoded image signal having first, second and third interpolating devices for respectively processing the encoded image signal as a still image, moving image and middle image so as to obtain first, second and third image signals. The temporal frequency of the encoded image signal is detected and, in response thereto, the first, second or third image signal is supplied from the apparatus. A summation mixing circuit mixes the overlapping portions between the first and second image signals and between the second and third image signals.

3 Claims, 12 Drawing Sheets

↓ Pre-Filter and VOS

FIG. 6B

↓ 12MHz LPF

FIG. 6C

↓ Rate Conversion

FIG. 6D

↓ FOS/LOS

TELEVISION SIGNAL RECEIVING APPARATUS

BACKGROUND OF THE INVENTION

1. Field of the Invention

The present invention generally relates to television receivers and, more particularly, is directed to a television receiver for use as a decoder for decoding a high definition television signal in which the width of the baseband has been compressed by a so-called MUSE (multiple sub-Nyquist-sampling encoding) system.

3. Description of the Prior Art

In order to broadcast a high vision signal (i.e., a high definition signal) by one channel of a broadcasting satellite, which has a bandwidth of 27 MHz, the band width of the high vision signal, which has a signal band width of about 20 to 25 MHz, is compressed to about less than 9 MHz according to the FM (frequency modulation) system. To perform such high definition television broadcasting over one channel of the broadcast satellite, the MUSE system was developed which compresses the baseband width of a high definition signal up to 8.1 MHz without deteriorating the quality of the high definition picture.

In converting a video signal from the form of an analog signal to a digital signal in the MUSE system encoder, the necessary sampling points are selected and the other remaining sampling points are discarded (this is a so-called sampling operation), so as to compress the band of the video signal.

The video signal is a three-dimensional signal which may be expressed along horizontal and vertical axes and a time direction axis. The sampling operation can be performed along any one of the three-dimensional axes or along an arbitrary axis which crosses the three-dimensional axes. Further, if a ½ sub-sampling is carried out along a certain axis, then the resolution of the video signal in that axial direction is reduced by one half. On the basis of a visual inspection, the resolution appears deteriorated for a moving picture. As a result, in the MUSE system, a motion detecting circuit determines whether each pixel (picture element) is a still pixel or a moving pixel, and a sub-sampling system of the input signal having a sampling frequency of 48.6 MHz is selectively switched.

More specifically, in a still pixel area (i.e., a still picture area), the following succession of operations are performed. That is, field offset sub-sampling (hereinafter, referred to as "VOS") by a clock pulse of 24.3 MHz, interpolation filtering by a frequency of 12 MHz, conversion to a sampling frequency of 32.4 MHz and frame offset sub-sampling (hereinafter, referred to as "FOS") by a clock pulse of 16.2 MHz. If the number of horizontal scanning lines per frame is odd, the FOS becomes equivalent to a line offset sub-sampling (hereinafter, referred to as "LOS") and therefore this FOS can be considered a frame/line offset sub-sampling (FOS/LOS). On the other hand, in a moving pixel area (a moving picture area), the following succession of operations are performed. That is, a band-limiting operation by a low-pass filter whose cut-off frequency is 16 MHz, a conversion to a sampling frequency of 32.4 MHz and processing of offset sub-sampling (LOS) by a clock pulse of 16.2 MHz. In actual practice, a sub-sampling signal of a still image area and a sub-sampling signal of a moving image area at each pixel of an image are generated and summation-mixed in response to the change between frames of the signals of each pixel.

Figure 1:
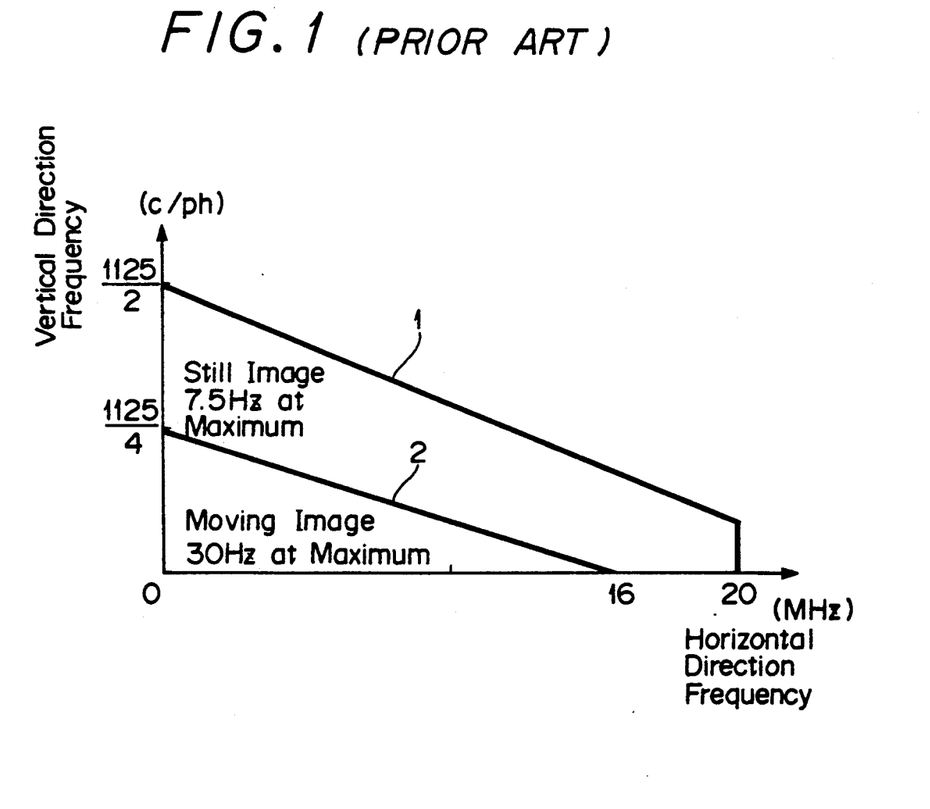
FIG. 1 is a schematic diagram showing a transmission band of a conventional MUSE system.

FIG. 1 shows a transmission band of the conventional MUSE system, in which the abscissa axis represents the spatial frequency in the horizontal direction of an image and is expressed in units of a sampling frequency (MHz), and the ordinate axis represents the spatial frequency in the vertical direction of an image, and is expressed in units of c/ph (cycles/picture height) which is the number of horizontal scanning lines per picture. The sampling frequency (MHz) units along the horizontal direction have substantially the same meaning as Msps (samples per second) and, as a result, indicate the number of samples along the horizontal direction per second. As is to be appreciated, a television line is indirectly utilized in the units of spatial frequency in the vertical direction. The relationship between a c/ph and a television line may be expressed as follows:

$$1[c/ph] = 2 \text{ [television lines]}$$

Furthermore, since a high definition signal has 1125 horizontal scanning lines per frame, a sampling frequency of an input signal of a MUSE signal of 48.6 MHz and a field frequency of 60 Hz, on the basis of Nyquist's theorem, the upper limits of the transmission bands of the vertical, horizontal and the time directions are 1125/2c/ph, 24.3 MHz and 90 Hz, respectively.

In FIG. 1, an area 1, having a substantially triangular shape, represents a transmission band of a still image area and a triangular area 2 represents a transmission band of a moving image area. The resolutions in the oblique directions in the still image and moving image areas may be respectively reduced by one half by the offset sub-sampling operation. Further, since one picture is composed of two frames in the still image area and one picture is formed by intra-field interpolation in the moving image area, the maximum value in which an image can be transmitted without frequency distortion (temporal frequency) in a time direction of motion of an image is ¼ of the frame frequency (7.5 Hz) and ½ of the field frequency (30 Hz) in the transmission band 1 of the still image area and the transmission band 2 of the moving image area, respectively. In the band in which the frequency in the horizontal direction in the transmission band 1 of the still image area is less than 4 MHz, aliasing noise does not occur due to the FOS so that the maximum value of the temporal frequency becomes 15 Hz.

In the conventional MUSE system, as described above, since the area in which the temporal frequency of the motion is less than 7.5 Hz is processed as a still image area, the resolution is satisfactory in any of the horizontal, vertical and oblique directions. However, the areas in which the temporal frequency of the motion exceed 7.5 Hz are all processed as moving image areas. In this situation, the transmission band 2 of the moving image area is limited particularly in the oblique direction. More specifically, when oblique lines are formed at a relatively small pitch, approximately $4\sqrt{2}$ (that is about 6) horizontal scanning lines are vibrated at a frequency higher than 7.5 Hz and, as a result, these oblique lines will be blurred.

To eliminate the above-mentioned disadvantages, a signal having a high resolution with respect to a signal (a middle signal) of an area existing in the band of a predetermined band width may be transmitted with, for example, the motion temporal frequency of 7.5 Hz by improving the MUSE systems band compressing method. However, this proposal is not too practical because it necessitates changing the broadcasting system itself. Accordingly, it is preferable that the resolution of the middle signal be improved by modifying only a decoder (television receiver conforming to the MUSE system) located at the viewer's side without modifying the encoder at the broadcasting station side.

OBJECTS AND SUMMARY OF THE INVENTION

Accordingly, it is an object of the present invention to provide an improved decoding apparatus for decoding a transmitted image signal which avoids the aforenoted disadvantages of the prior art.

More specifically, it is an object of the present invention to provide an improved decoding apparatus for decoding a transmitted image signal in which so-called blurring of a reproduced image in an area having a middle temporal frequency can be suppressed in a MUSE (multiple sub-Nyquist-sampling encoding) system by providing the improved decoding apparatus in a television receiver located at the viewer's side.

It is another object of the present invention to provide an improved television apparatus which is suitably applied to the MUSE system.

According to a first aspect of the present invention, a decoding apparatus for decoding a transmitted encoded image signal having an associated temporal frequency comprises first interpolating means operative for processing the encoded image signal as a still image signal so as to obtain a first image signal for supply from the apparatus when the temporal frequency of the encoded image signal has a value less than a first predetermined value so as to lie in a relatively low temporal frequency region of a motion frequency band; second interpolating means operative for processing the encoded image signal as a moving image signal so as to obtain a second image signal for supply from the apparatus when the temporal frequency of the encoded image signal has a value higher than a second predetermined value and less than a third predetermined value so as to lie in a relatively high temporal frequency region of the motion frequency band; third interpolating means operative for processing the encoded image signal as a middle image signal so as to obtain a third image signal for supply from the apparatus when the temporal frequency of the encoded image signal has a value between the first predetermined value and the second predetermined value so as to lie in a middle temporal frequency region of the motion frequency band; and summation mixing means for mixing overlapping portions between the first image signal and the second image signal and between the second image signal and the third image signal.

In accordance with a second aspect of the present invention, in a television receiver having a display, a decoding apparatus for decoding a transmitted encoded image signal comprising first regenerating means having inter-frame interpolating means and first inter-field interpolating means operative for processing the encoded image signal as a still image signal so as to obtain a first image signal; second regenerating means having intra-field interpolating means operative for processing the encoded image signal as a moving image signal so as to obtain a second image signal; third regenerating means having second inter-field interpolating means operative for processing the encoded image signal as a middle image signal so as to obtain a third image signal; and detecting means for detecting motion between portions of the encoded image signal and, in response thereto, for selecting one of the first, second and third regenerating means so as to supply the respective one of the first, second and third image signals to the display, the first regenerating means being selected when the encoded image signal has a temporal frequency less than a first predetermined frequency so as to lie in a relatively low temporal frequency region of a motion frequency band, the second regenerating means being selected when the encoded image signal has a temporal frequency higher than a second predetermined frequency and less than a third predetermined frequency so as to lie in a relatively high temporal frequency region of the motion frequency band, and the third regenerating means being selected when the encoded image signal has a temporal frequency between the first predetermined frequency and the second predetermined frequency so as to lie in a middle temporal frequency region of the motion frequency band.

The above, and other objects, features and advantages of the present invention will become apparent from the following detailed description of an illustrative embodiment thereof to be read in conjunction with the accompanying drawings, in which corresponding parts are identified by the same reference numerals.

DETAILED DESCRIPTION OF THE PREFERRED EMBODIMENT

A television receiver according to an embodiment of the present invention will now be hereinafter described with reference to FIGS. 2 to 11. This embodiment of the present invention is applied as a decoder in the MUSE system.

Figure 2A:
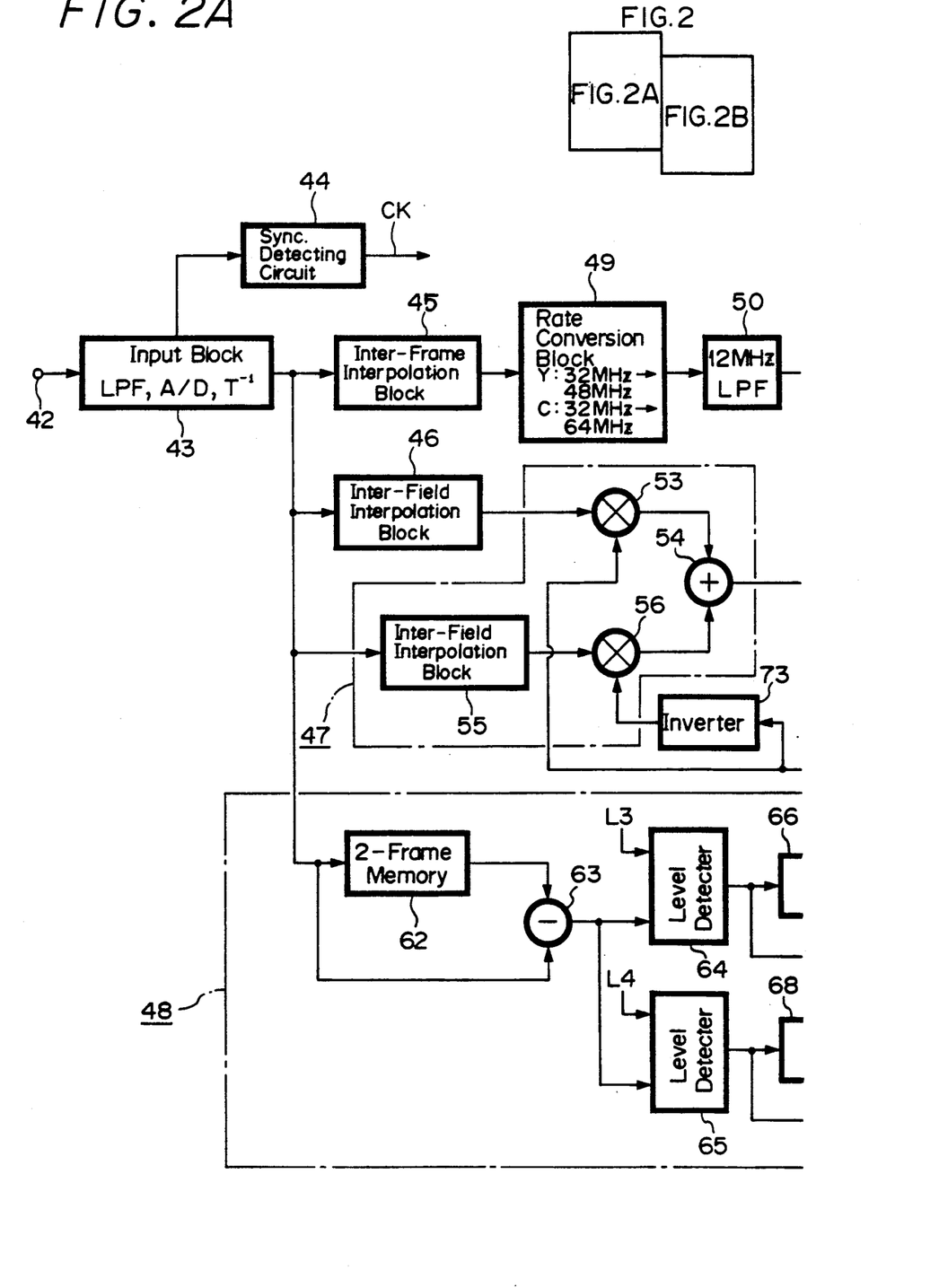
FIGS. 2A and 2B illustrate a block diagram of a decoder apparatus according to an embodiment of the present invention.
Figure 2B:
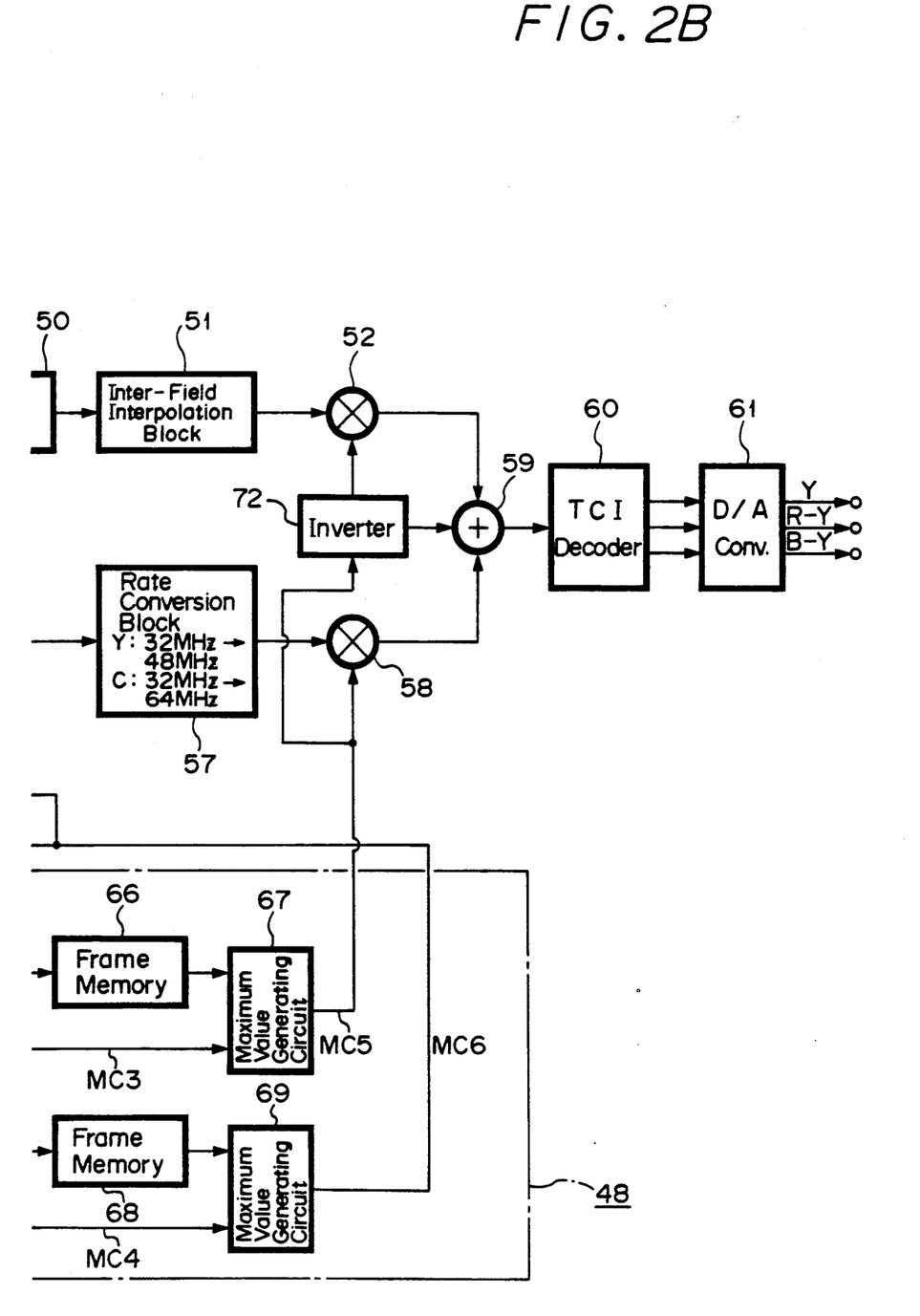

FIG. 2 illustrates in block form a MUSE system decoder in accordance with an embodiment of this invention.

An input block section 43 of FIG. 2 comprises a low-pass filter circuit, an analog-to-digital (A/D) converter having a sampling frequency of 16 MHz, and an inverted gamma characteristic circuit for a transmission line or the like. A MUSE system baseband output signal from a broadcast satellite (BS) tuner (not shown) is supplied through an input terminal 42 to the input block section 43. A clock pulse CK for A/D conversion or the like is reproduced from the baseband signal by a synchronizing (sync.) detecting circuit 44.

An inter-frame interpolation block section 45 is coupled to input block section 43 and is adapted to obtain a still image signal of one frame period having a sampling frequency of 32 MHz by interpolating 2 frame periods of data. An intra-field interpolation block section 46 is coupled to input block section 43 and is adapted to obtain a moving picture signal of one field period having a sampling frequency of 32 MHz by interpolating one field period of data. A block section 47, shown by a one-dot chain line, and a moving area detecting circuit 48 are also coupled to input block section 43. A video output signal from the input block section 43 is supplied to the interpolation block sections 45 and 46, the block section 47 and the moving area detecting circuit 48. An output signal having a luminance signal Y and a chroma signal C from the inter-frame interpolation block 45 is supplied to a rate converting block 49, in which the sampling frequencies of the luminance signal Y and the chroma signal C from the block 45 are respectively converted to 48 MHz and 64 MHz. The rate-converted signal from the rate converting block 49 is supplied through a 12 MHz low-pass filter block 50 and an inter-field interpolation block 51 to one input port of a multiplier 52. An output signal from multiplier 52 is supplied to one input port on an adder 59. The inter-field interpolation block 51 restores a still image signal of one frame period by interpolating a signal which results from field offset sub-sampling (VOS) a signal of two fields with a still image signal pre-filter having the characteristic shown by the area 1 of FIG. 1.

The intra-field interpolation block 46 has the moving picture signal filter characteristic shown, by the area 2 of FIG. 1. The moving picture signal reproduced by the interpolation block 46 is supplied to one input port of a multiplier 53. The output signal from the multiplier 53 is supplied to one input port of an adder 54.

An inter-field interpolation block 55 of block 47 receives the output signal from the input block section 43. The inter-field interpolation block 55 adds the received signal in a field-addition manner and interpolates the added signal by a filter having the characteristic of area 3 of FIG. 3 so as to reproduce a middle image signal having a horizontal frequency of 32 MHz. The middle image signal from block 55 is supplied to one input port of a multiplier 56. An output signal of this multiplier 56 is supplied to the other input port of the adder 54. An output signal having a luminance signal Y and a chroma signal C of the adder 54 is supplied to a rate conversion block 57, in which the sampling frequencies of the luminance signal Y and chroma signal C are converted to sampling frequencies of 48 MHz and 64 MHz, respectively. The rate-converted signal from the rate conversion block 57 is supplied to one input port of a multiplier 58. An output signal of the multiplier 58 is supplied to another input port of the adder 59. A TCI (time-compressed integration) decoder 60 receives an output signal from the adder 59 and timebase-expands the chrominance signal C of the output signal of the adder 59 so as to generate a luminance signal Y and red and blue color difference signals R-Y and B-Y. The luminance signal Y and red and blue color difference signals R-Y and B-Y from the decoder 60 are supplied through a digital-to-analog (D/A) converter 61 to a picture tube (not shown).

Figure 4:
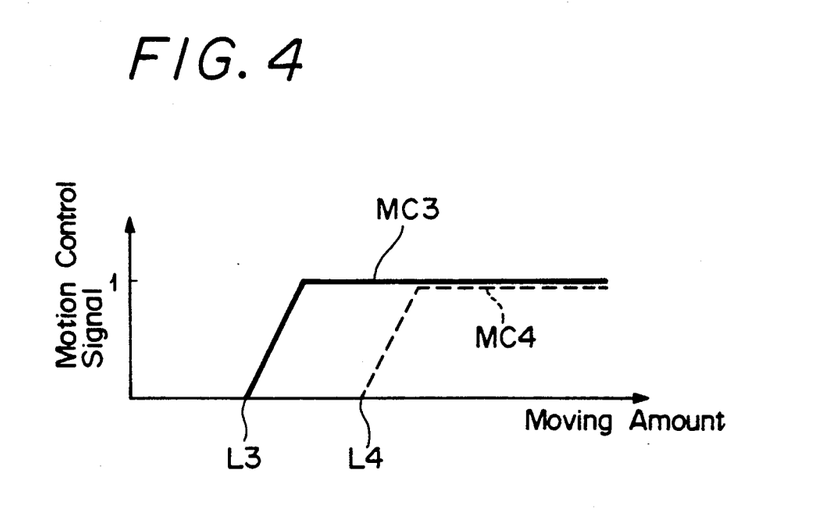
FIGS. 4 and 5 are schematic diagrams used to explain the characteristics and operation of a moving image area detecting circuit of the apparatus of FIG. 2.

The video output signal from the input block 43 is supplied directly and through a 2-frame memory 62 to the subtracting side input port and adding side input port of a subtracter 63, respectively. As a result of the frame/line offset sub-sampling (FOS/LOS) performed in the MUSE type encoder, the same sampling point does not exist during one frame period, but the same sampling point constantly exists during two frame periods. As a result, an output signal of the subtracter 63 accurately expressed the motions of the respective pixels of a transmitted video image. An output signal of the subtracter 63 and a signal L3 having a positive value are supplied to a level detector 64, while the output signal of the subtracter 63 and a signal L4 having a positive value are supplied to a level detector 65. In a preferred embodiment, as shown in FIG. 4, an inequality of L3<L4 is established, in which a motion temporal frequency corresponding to the signal L3 is set to 7.5 Hz and a motion temporal frequency corresponding to the signal L4 is set to 15 Hz.

The level detector 64 generates a motion control signal MC3, which may have 4 bits, whose value changes from, for example, 0 to 1 each time the absolute value of the output signal of the subtracter 63 changes from 0 through the value of the signal L3 to a larger value. This motion control signal MC3 is supplied directly and through a frame memory 66 to a maximum value generating circuit 67, which is adapted to derive the signal having the larger value (hereinafter, referred to as the motion control signal MC5) from the two input signals. The motion control signal MC5 from the generating circuit 67 is supplied to the other input port of the multiplier 58, and through an inverter 72 so as to form a motion control signal whose value is changed to "1-MC5" to the other input port of the multiplier 52. The maximum value generating circuit 67 accurately detects motion information of not only the present frame but also of the preceding frame. As is to be appreciated, such detection is provided because one picture amount of data in the still image area is reproduced from the data of two frames.

In a similar manner, the level detector 65 generates a motion control signal MC4, which may have 4 bits, whose value changes from, for example, 0 to 1 when the absolute value of the output signal of the subtracter 63 changes from 0 through the value of the signal L4 to a large value. This motion control signal MC4 is supplied directly and through a frame memory 68 to a maximum value generating circuit 69, which is adapted to derive the signal (hereinafter, referred to as the motion control signal MC6) having the larger value from the two input signals. This motion control signal MC6 from the generating circuit 69 is supplied to the other input port of the multiplier 53 and through an inverter 73 so as to form a motion control signal whose value is changed to "1-MC6" to the other input port of the multiplier 56.

Figure 5:
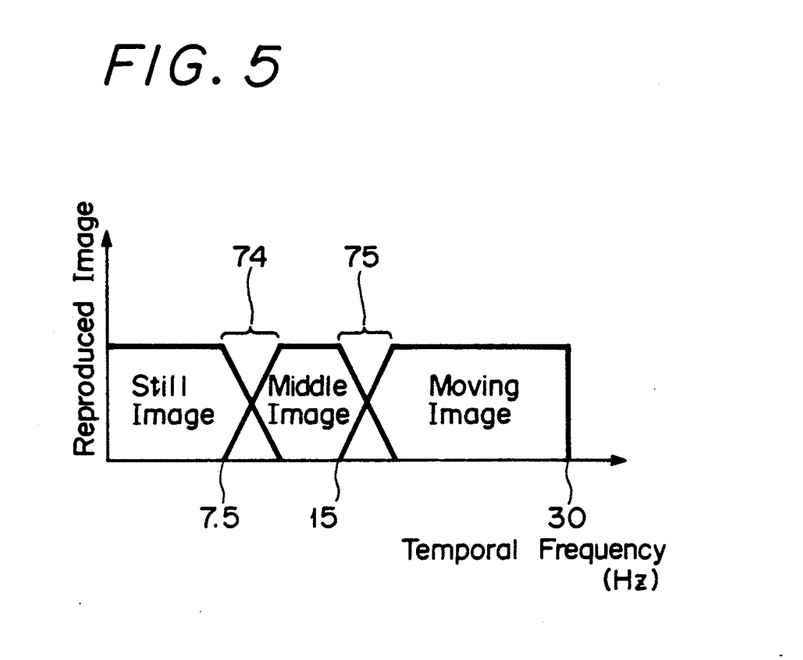

FIG. 5 represents frequency (temporal frequency) of the motion of a pixel to be reproduced in the transmitted image data in the timebase direction on the abscissa axis. Due to the above-mentioned motion control signals MC5 and MC6, and as shown in FIG. 5, a signal (still image signal) decoded by the inter-frame interpolation block 45 to the inter-field interpolation block 51 is supplied to the picture tube when the temporal frequency is in the range of 0 to 7.5 Hz; a signal (intermediate frequency signal) primarily decoded by the inter-field interpolation block 55 is supplied to the picture tube when the temporal frequency is in the range of 7.5 Hz to 15 Hz; and a signal (moving picture signal) decoded by the inter-field interpolation block 46 is supplied to the picture tube when the temporal frequency is in the range of 15 Hz to 30 Hz. Further, in FIG. 5, an area 74 has a frequency in the timebase direction which lies in a range starting from approximately 7.5 Hz and having a predetermined width (e.g., 3 Hz) and an area 75 has a frequency which lies in a range starting from approximately 15 Hz and having a predetermined width. In the area 74, the still image signal and the middle image signal are weighted and mixed and supplied to the picture tube. Similarly, in the area 75, the middle image signal and the moving image signal are weighted and mixed and supplied to the picture tube.

Figure 3:
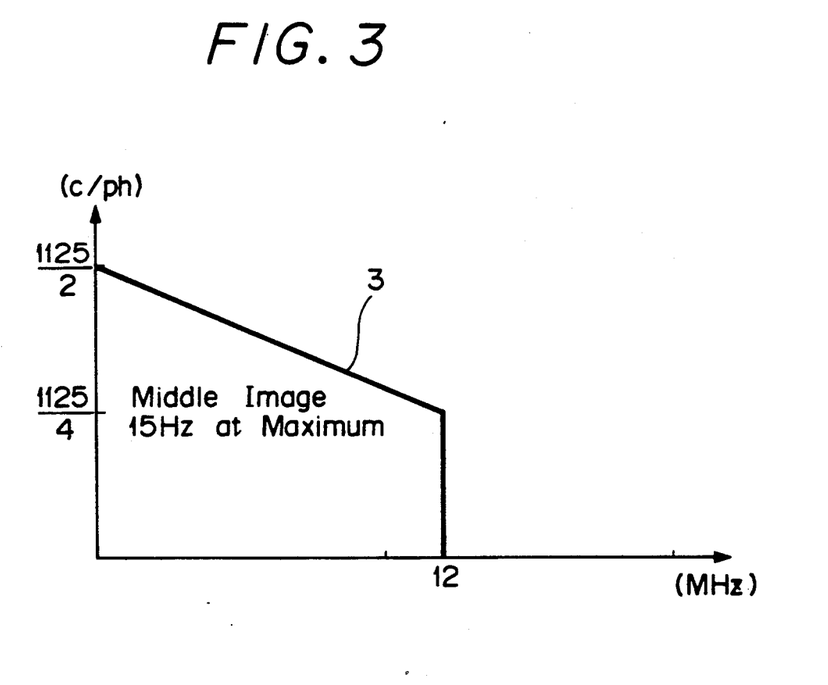
FIG. 3 is a schematic diagram showing a band of the decoder apparatus of FIG. 2.

The decoder of FIG. 2 utilizes the moving area detecting circuit 48 to detect the temporal frequency of the motion of the pixel which is to be reproduced and switches the still image signal, the middle image signal and the moving image signal in response to the temporal frequency. As shown in FIG. 3, the spatial frequency band of the middle image signal is substantially equal to the area of the band of the still image signal (that is, area 1 of FIG. 1) except for the area corresponding to the frequency along the horizontal direction higher than 12 MHz. As compared with the band of the moving image signal, (that is, area 2 of FIG. 1) the band of the middle image signal is extended in a well-balanced manner in all directions, that is, the horizontal, vertical and oblique directions. Further, when only the inter-field interpolation is performed, the re-sampling frequency at the same sampling point is substantially equal to the frame frequency (30 Hz) so that, in accordance with the Nyquist conditions, the maximum frequency of the middle image signal in the timebase direction, which can be transmitted without distortion, is 15 Hz. On the other hand, as earlier noted, the maximum frequencies of the still image signal and the moving image signal in the timebase directions, which can be transmitted without distortion, are 7.5 Hz and 30 Hz, respectively. Therefore, by use of the decoder of the present invention, blurring in a reproduced image which moves a little faster than that of the still image area and in which the frequency in the timebase direction lies in a medium range area (middle image area) can be reduced.

As is to be appreciated from FIGS. 1 and 3, the resolution of the middle image signal in the horizontal direction is somewhat less than that of the moving image signal in the horizontal direction. However, when the resolution of the image in both the vertical and oblique directions are considered, the resolution of the middle image signal is generally improved as compared to the resolution of the moving image signal.

The degree of aliasing noise of the middle image signal will now be discussed. In this case, since the middle image signal is generated by interpolating the still image signal in an inter-field interpolation fashion, the spatial frequency structure of the still image signal at the MUSE type encoder stage will be initially explained.

Figure 6A:
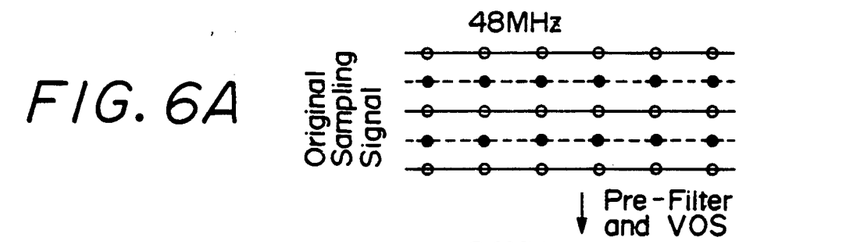
FIGS. 6A to 6E are schematic diagrams to which reference will be made in explaining how a sampling pattern of a still image signal in the MUSE system is changed.
Figure 6B:
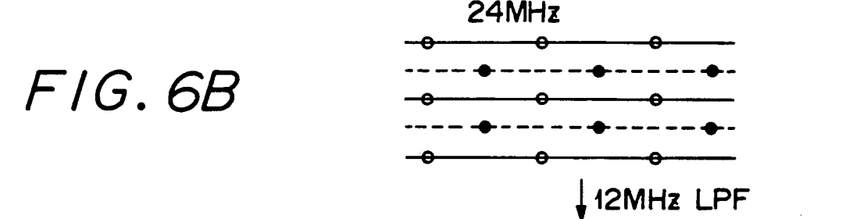
Figure 7A:
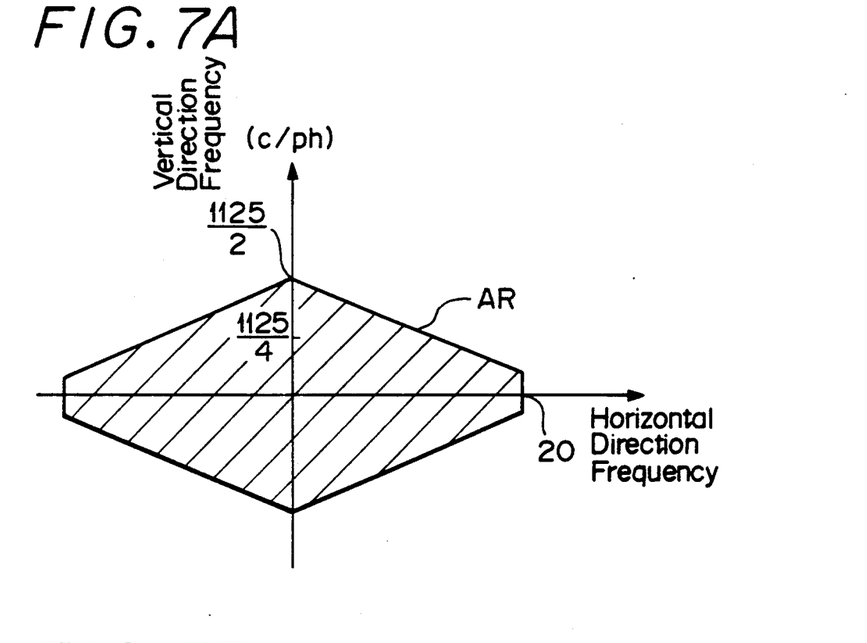
FIGS. 7A and 7D are schematic diagrams showing the change of a spatial frequency structure of a still image signal in the MUSE encoder.
Figure 7B:
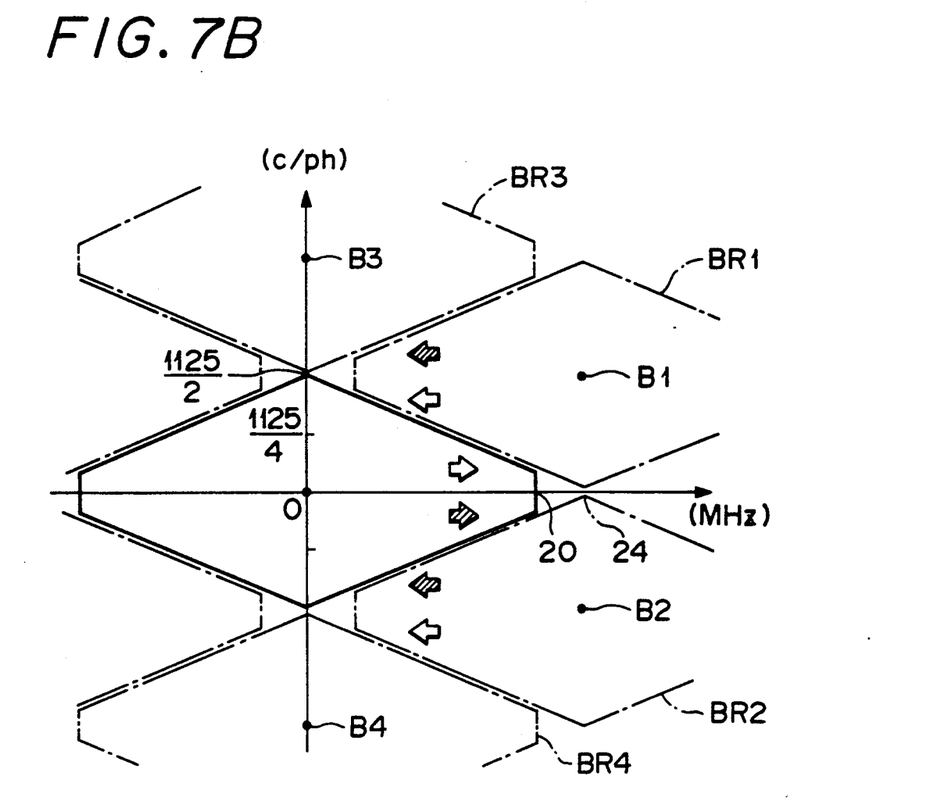

In this encoder, the original sampling points of the still image signal form a tetragonal lattice having a frequency of 48 MHz in the horizontal direction as, for example, shown in FIG. 6A. If this still image signal is filtered-out by a prefilter which passes only the spatial frequency component of an area, for example, an area AR, shown as, a hatched area in FIG. 7A, and is processed by the field offset sub-sampling (VOS) processing as shown in FIG. 6B, the spatial frequency structure becomes, on the basis of a convolution theory, a structure as shown in FIG. 7B which includes fundamental component areas BR1, BR2, BR3, . . . , which result from folding the area AR respectively about solid circles B1, B2, B3, . . . ,. Since the coordinates of the solid circles B1 and B2 are (24 MHz, ±1125/2c/ph), aliasing noise does not occur at this stage. Further, the temporal frequencies of the solid circles B1 and B2 are substantially equivalent to 30 Hz.

Figure 6C:
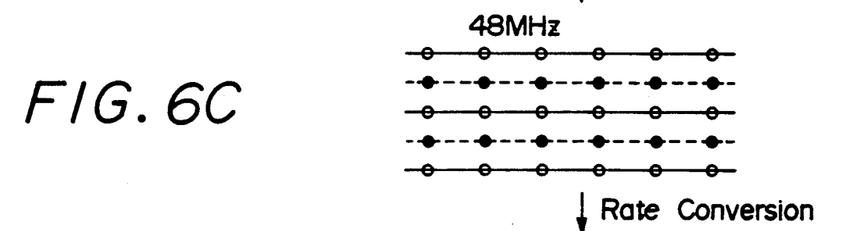
Figure 7C:
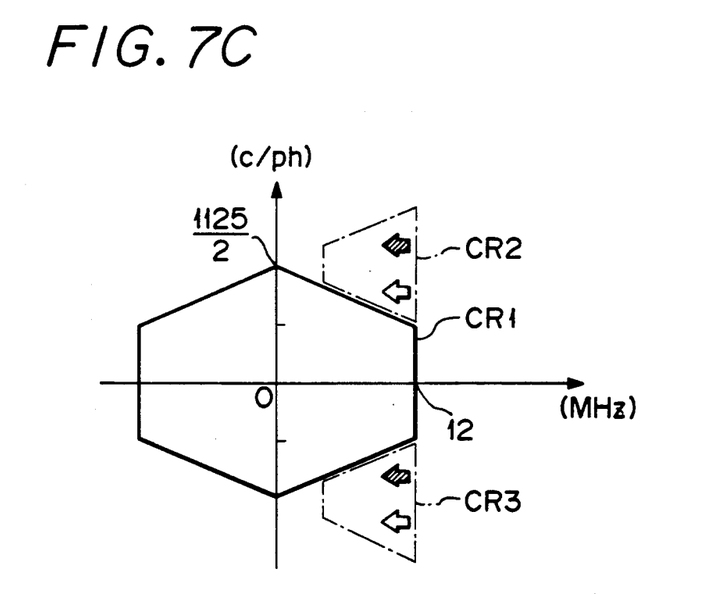

If the interpolation is performed on the filtered and processed signal of FIG. 6B by the 12 MHz low-pass filter, then a tetragonal lattice sampling pattern as shown in FIG. 6C is obtained. Areas in which the frequency of this signal in the horizontal direction lie in the range of −12 Mhz to 12 MHz and in which the spatial frequency is not zero become areas CR1, CR2, CR3, . . . , as shown in FIG. 7C. As is to be appreciated, although areas corresponding to the areas CR2 and CR3 exist in the areas in which the frequency along the horizontal direction is negative, such areas are not shown. Likewise, repeated areas along the frequency axis in the vertical direction (longitudinal axis) are also not shown.

Figure 6D:
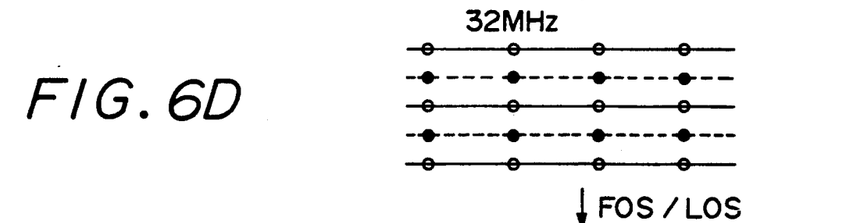
Figure 6E:
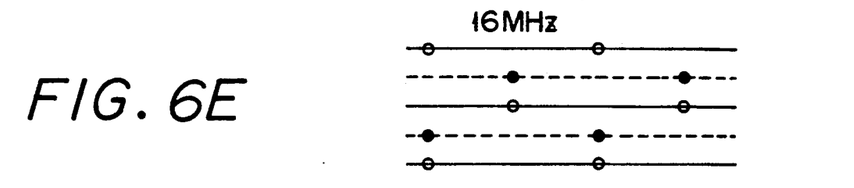
Figure 7D:
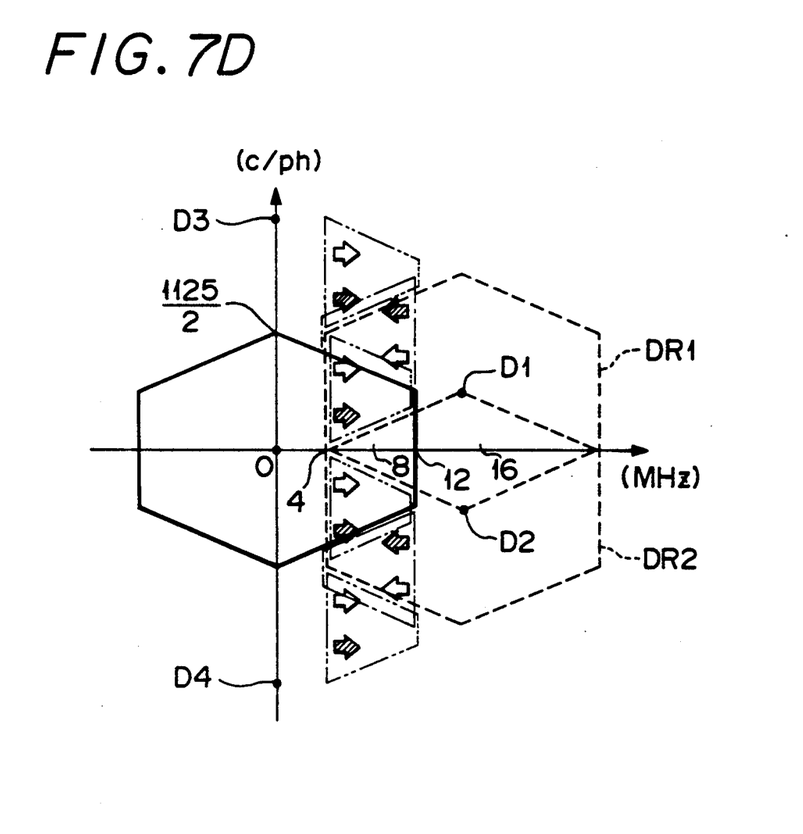

The frequency along the horizontal direction of the still image signal is converted from 58 MHz to 32 MHz by the encoder, as shown by the state of FIG. 6D, and frame/line offset sub-sampling (FOS/LOS) is performed. As a result, a hexagonal lattice sampling pattern, as shown in FIG. 6E, is obtained at the transmission stage. The spatial frequency structure of the signal at this transmission stage has fundamental component areas DR1, DR2, . . . , as shown in FIG. 7D, which result from folding the fundamental component areas of FIG. 7C respectively about solid circles D1, D2, . . . ,. In this case, coordinates of the solid circles D1 and D2 in spatial frequency space are (16 MHz, 1125/4c/ph) and (16 MHz, −1125/4c/ph), respectively, and temporal frequencies of the solid circles D1 and D2 are substantially equivalent to 15 Hz.

Figure 8A:
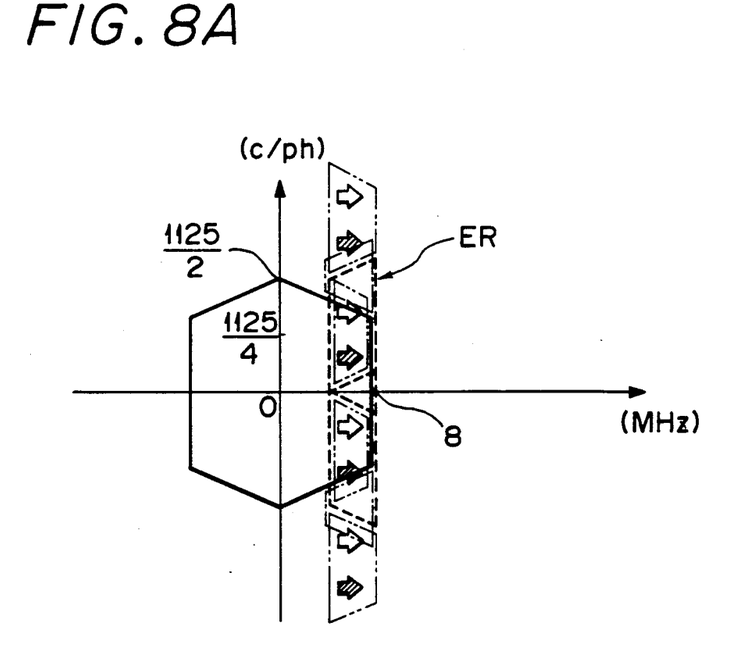
FIGS. 8A to 8C are schematic diagrams showing the change of a spatial frequency structure of a middle image in the decoder of FIG. 2.
Figure 8B:
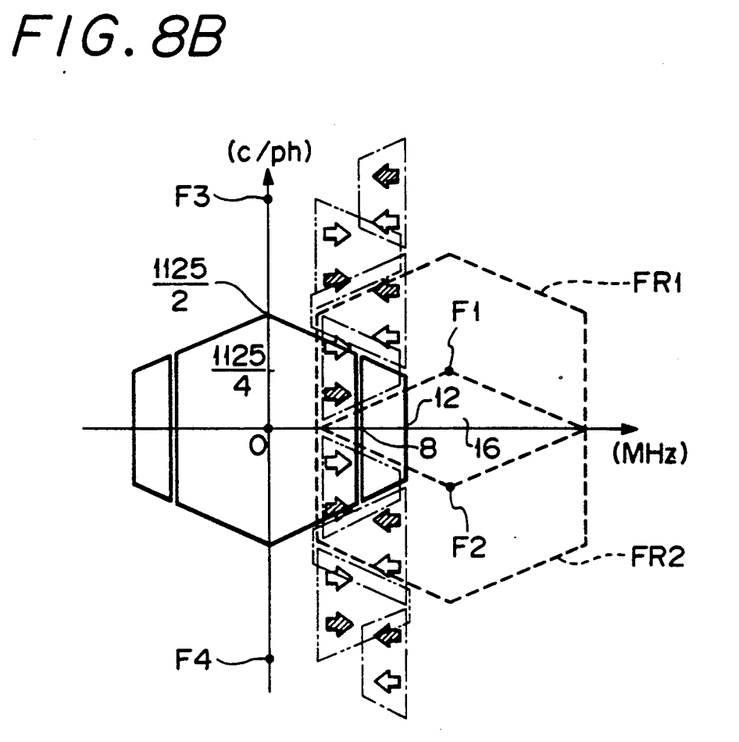

Since the band of the transmission line in the MUSE system is 8 MHz, the spatial frequency structure at the input stage of the inter-field interpolation block 55 of FIG. 2 includes a fundamental component area ER, as shown in FIG. 8A, which is repeated along the abscissa and ordinate directions. The spatial frequency structure after the input signal is added at every field by the inter-field interpolation block 55 includes fundamental component area FR1, FR2, . . . , as shown in FIG. 8B, which result from folding the fundamental area ER of FIG. 8A respectively about solid circles F1, F2, . . . ,, Coordinates of the solid circles F1 and F2 are the same as those of the solid circles D1 and D2 of FIG. 7D, and the pattern of FIG. 8B is substantially the same as that of FIG. 7D.

Figure 8C:
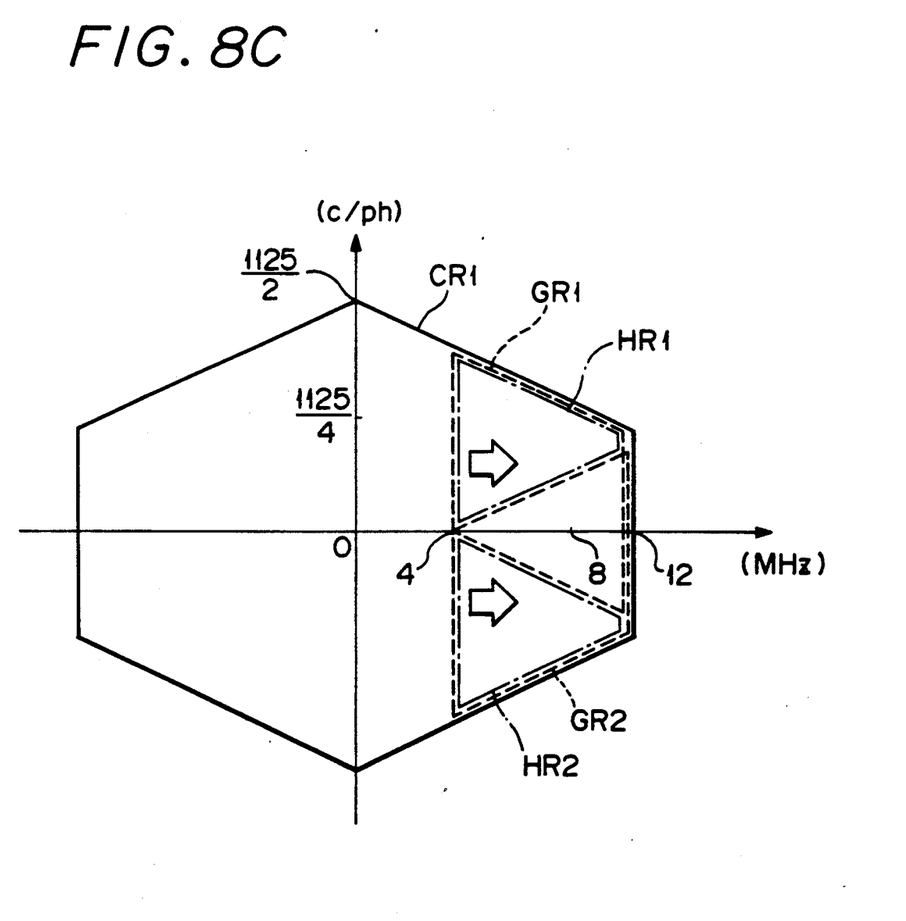

When the signal which results from field-addition is processed by the interpolation filtering process by the inter-field interpolation block 55 having the filter characteristic shown in FIG. 3, a middle image signal having a frequency component in an area CR1 of FIG. 8C is obtained. In the band of this middle image signal having a frequency along the horizontal direction in the range from 4 to 8 MHz, areas in the still image signal area AR of FIG. 7A in which the frequency along the horizontal direction lies in a range from 12 to 20 MHz are folded as areas HR1 and HR2, as shown by one-dot chain lines in FIG. 8C, and areas of the still image signal area AR in which the frequency along the horizontal direction lies int he range from 12 to 4 MHz are folded as areas GR1 and GR2 as shown by broken lines in FIG. 8C. With regard to the original still image signal, the component having a frequency along the horizontal direction in the range from 12 to 20 MHz is not relatively strong and the magnitude of the aliasing signal of the component having a frequency along the horizontal direction in the range from 12 to 4 MHz is about ½ so that the image quality of the reproduced picture is prevented from being substantially deteriorated.

When a signal of the middle image area having a temporal frequency in the range from 7.5 to 15 Hz is processed by the inter-frame interpolation block 45 to the inter-field interpolation block 51 of the decoder of FIG. 2 in a still image signal processing fashion, the signal from 4 fields is interpolated and, as a result, a relatively large deterioration of image quality, such as displacement of image or the like, occurs. Further, when a signal in the middle image area is processed in a moving image signal processing fashion by the intra-field interpolation block 46 of the decoder of FIG. 2, the resolution of the reproduced image is restricted to the area 2 of FIG. 1 and, as a result, the image is considerably blurred. On the other hand, when a signal in the middle image area is processed in a middle image signal processing fashion by the inter-field interpolation block 55 of the decoder of FIG. 2, the image quality may be somewhat deteriorated due to aliasing noise, but as compared with the above-mentioned cases in which the signal is processed in either the still image signal or the moving image signal processing fashions, an image having excellent image quality with possibly only a few blurs is obtained.

Therefore, the decoder of the present invention reduces blurs in a reproduced image in a middle image area which has a temporal frequency in a medium range (for example, 7.5 Hz to 15 Hz.).

An example of the inter-field interpolation block 55 of FIG. 2 will now be explained with reference to FIGS. 9 to 11.

Figure 9:
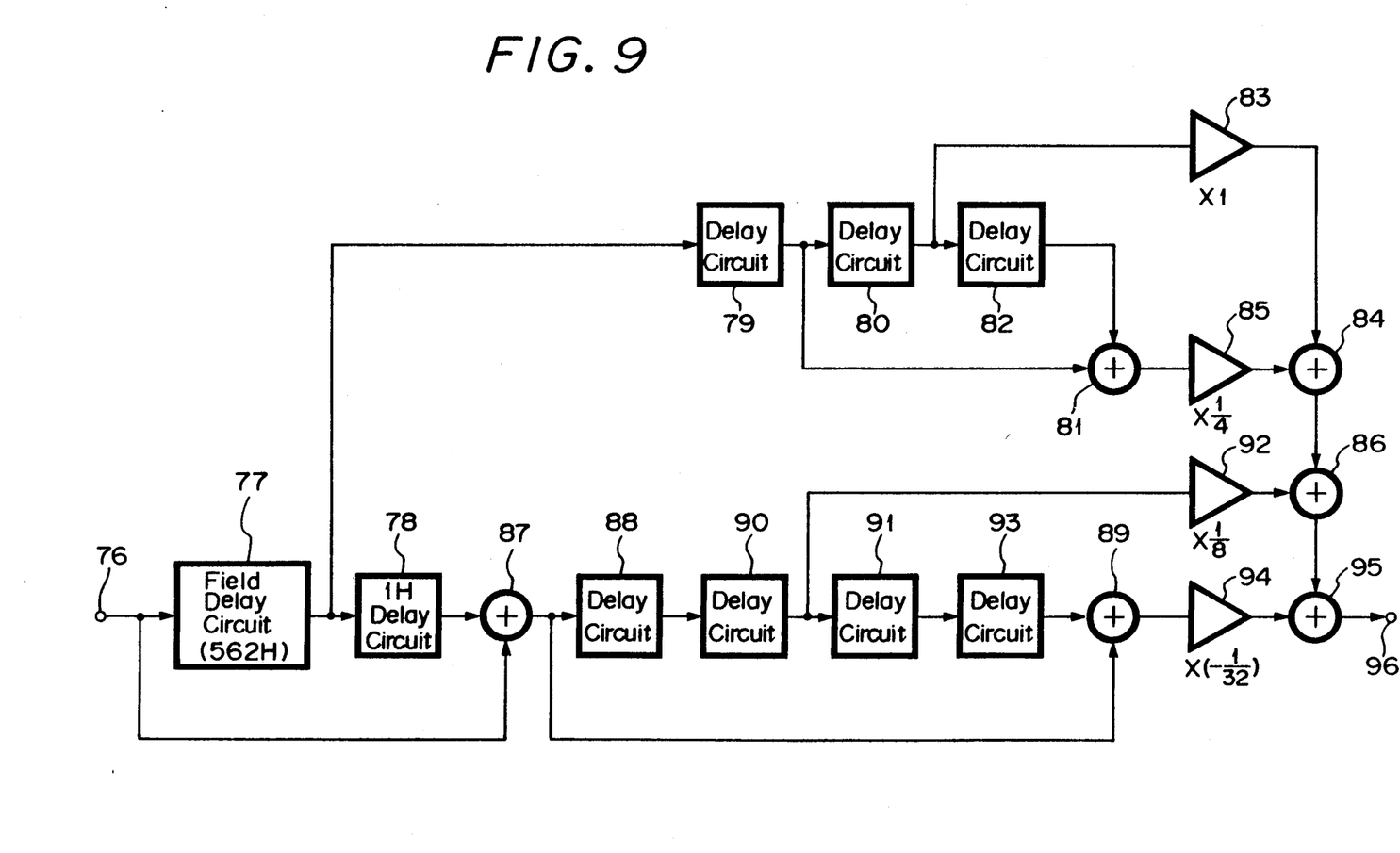
FIG. 9 is a schematic block diagram showing an example of a simple arrangement of the inter-field interpolation block of the apparatus of FIG. 2.

FIG. 9 is a block diagram of an example of the inter-field interpolation block 55 in which the video signal of a predetermined bit from the input block 43 is supplied to an input terminal 76.

D represents a cycle of a frequency of 32 MHz and 1 H represents one horizontal line cycle. The inter-field interpolation block 55 includes a field delay circuit 77 which has a delay time of 562 H (i.e., the value which results from subtracting ½ of one horizontal line cycle from one field cycle), a delay circuit 78 which has a delay time of 1 H and delay circuits 79, 80, 82, 88, 90, 91 and 93 each having a delay time of D. The video signal applied to the input terminal 76 is supplied through the field addition field delay circuit 77 to the delay circuits 78 and 79, and is further supplied to one input terminal of an adder 87. An output signal of the delay circuit 79 is supplied to the delay circuit 80 and to one input terminal of an adder 81. An output signal of the delay circuit 80 is supplied through the delay circuit 82 to the other input terminal of the adder 81, and is further supplied to a multiplier 83 having a multiplying coefficient of one. An output signal of the multiplier 83 is supplied to one input terminal of an adder 84. An output signal of the adder 81 is supplied through a multiplier 85 having a multiplying coefficient of ¼ to the other input terminal of the adder 84. An output signal of the adder 84 is supplied to one input terminal of an adder 86.

An output signal of the delay circuit 78 is supplied to the other input terminal of the adder 87. An output signal of the adder 87 is supplied through the delay circuits 88 and 90 to the delay circuit 91 and through a multiplier 92 having a multiplying coefficient of ½ to the other input terminal of the adder 86. An output signal of the adder 86 is supplied to one input terminal of an adder 95. The output signal of the adder 87 is further supplied to one input terminal of an adder 89, and an output signal of the delay circuit 91 is supplied through the delay circuit 93 to the other input terminal of the adder 89. An output signal of the adder 89 is supplied through a multiplier 94 having a multiplying coefficient of $-1/32$ to the other input terminal of the adder 95. A signal, which results from adding the output signals of the multipliers 92 and 94 and the output signal of the adder 84 by the adders 86 and 95, is supplied through an output terminal 96 to one input port of the multiplier 56 of FIG. 2. The signal at the output terminal 96 is a signal which has been interpolated in the inter-field interpolation processing manner.

Figure 10:
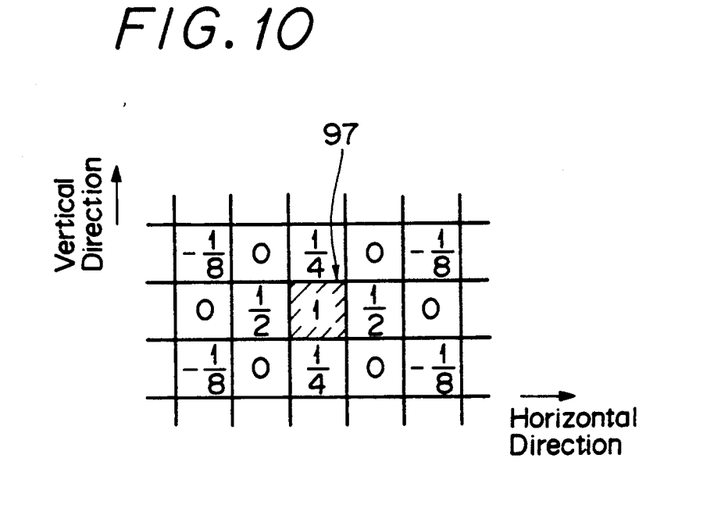
FIGS. 10 and 11 are schematic representations respectively illustrating tap coefficients and a filter characteristic of the interpolation block of FIG. 9.

As an example, assume that a pixel to be interpolated by the interpolation block 55 of FIG. 9 is at a position 97 as shown in FIG. 10. The weights (tap coefficients) of surrounding pixels used in the addition by the interpolation block 55 of FIG. 9 are as shown in FIG. 10. The filter characteristic provided by the interpolation block 55 in this example has a stepwise shape as shown by a solid line in FIG. 11. In FIG. 11, an open circle 98 at the coordinate (16 MHz, 1125/4c/ph) represents a zero transmission point which is sued to suppress a carrier component of 32 MHz.

Figure 11:
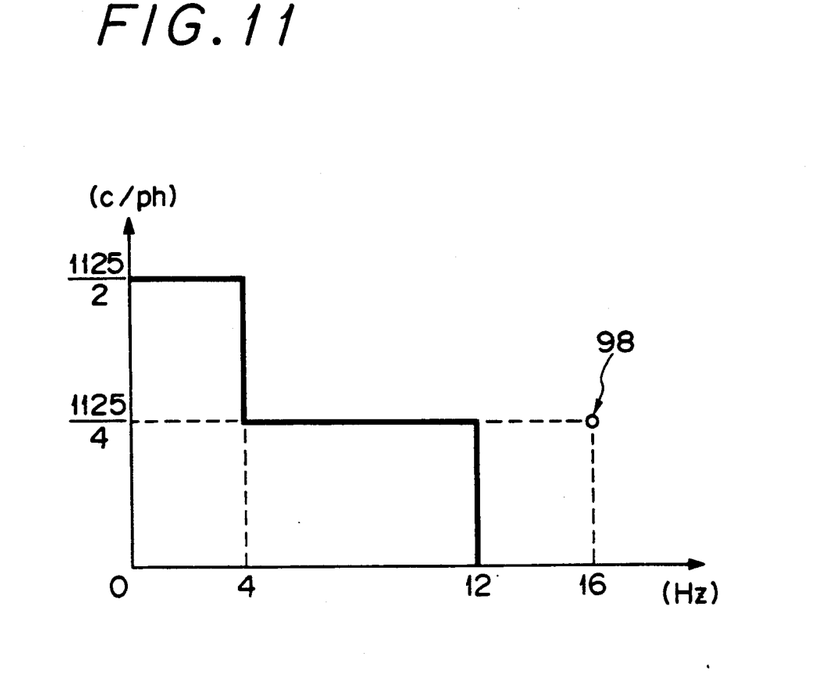

The filter characteristic of FIG. 11 is obtained by approximating the band of the middle image signal of FIG. 3. Image blurs can be reduced by this filter characteristic of FIG. 11 as compared with the moving image signal band (for example, the area 2 of FIG. 1). Further, when the above-mentioned approximated filter characteristic is utilized, the construction of the inter-field interpolation block can be simplified.

As described above, according to the present invention, so-called blurring of a reproduced image in an area of a middle temporal frequency can be suppressed in the MUSE (multiple sub-Nyquist-sampling encoding) system by improving only a decoder in a television receiver at the viewer's side.

Having described a preferred embodiment of the present invention with reference to the accompanying drawings, it is to be understood that the invention is not limited to that precise embodiment, and that various changes and modifications thereof could be effected by one skilled in the art without departing from the spirit or scope of the invention as defined in the appended claims.

I claim:

1. A decoding apparatus for decoding a transmitted encoded MUSE image signal having an associated temporal frequency, said apparatus comprising:

first interpolating means operative for processing said encoded image signal as a still image signal so as to obtain a first image signal for supply from said apparatus when the temporal frequency of said encoded image signal has a value less than a first predetermined value so as to lie in a relatively low temporal frequency region of a motion frequency band;

second interpolating means operative for processing said encoded image signal as a moving image signal so as to obtain a second image signal for supply from said apparatus when the temporal frequency of said encoded image signal has a value higher than a second predetermined value and less than a third predetermined value so as to lie in a relatively high temporal frequency region of said motion frequency band;

third interpolating means operative for processing said encoded image signal as a middle image signal so as to obtain a third image signal for supply from said apparatus when the temporal frequency of said encoded image signal has a value between said first predetermined value and said second predetermined value so as to lie in a middle temporal frequency region of said motion frequency band; and summation mixing means for mixing overlapping portions between said first image signal and said third image signal and between said second image signal and said third image signal.

2. A decoding apparatus for decoding a transmitted encoded image signal according to claim 1, in which said first interpolating means includes inter-frame interpolating means, said second interpolating means includes intra-field interpolating means and said third interpolating means includes inter-field interpolating means.

3. In a television receiver having a display, a decoding apparatus for decoding a transmitted encoded image signal, said apparatus comprising:

first regenerating means having inter-frame interpolating means and first inter-field interpolating means operative for processing said encoded image signal as a still image signal so as to obtain a first image signal;

second regenerating means having intra-field interpolating means operative for processing said encoded image signal as a moving image signal so as to obtain a second image signal;

third regenerating means having second inter-field interpolating means operative for processing said encoded image signal as a middle image signal so as to obtain a third image signal; and detecting means for detecting motion between portions of said encoded image signal and, in response thereto, for selecting one of said first, second and third regenerating means so as to supply the respective one of said first, second and third image signals to said display, said first regenerating means being selected when said encoded image signal has a temporal frequency less than a first predetermined frequency so as to lie in a relatively low temporal frequency region of a motion frequency band, said second regenerating means being selected when said encoded image signal has a temporal frequency higher than a second predetermined frequency and less than a third predetermined frequency so as to lie in a relatively high temporal frequency region of said motion frequency band, and said third regenerating means being selected when said encoded image signal has a temporal frequency between said first predetermined frequency and said second predetermined frequency so as to lie in a middle temporal frequency region of said motion frequency band.

* * * * *